Feb. 14, 1933.  R. THORNTON  1,897,153
TANDEM DRIVE FOR MOTOR VEHICLES
Filed Jan. 12, 1931  2 Sheets-Sheet 1

INVENTOR
Ray Thornton.
BY
ATTORNEY

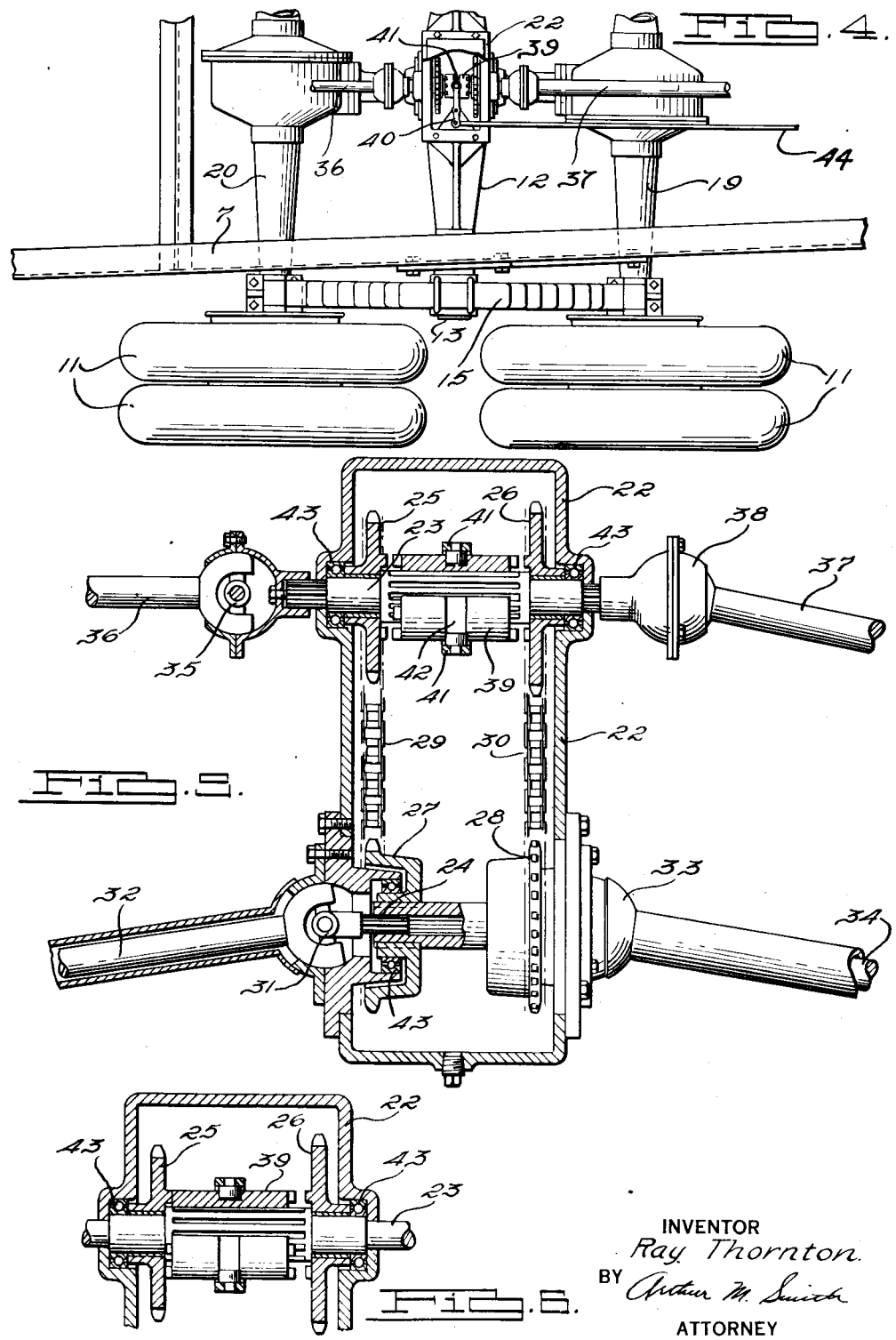

Patented Feb. 14, 1933

1,897,153

UNITED STATES PATENT OFFICE

RAY THORNTON, OF DETROIT, MICHIGAN, ASSIGNOR, BY DIRECT AND MESNE ASSIGNMENTS, TO PATENT DEVELOPERS, INC., A CORPORATION OF MICHIGAN

TANDEM DRIVE FOR MOTOR VEHICLES

Application filed January 12, 1931. Serial No. 508,322.

My invention relates to improvements in a tandem drive for motor vehicles and particularly to a tandem drive so designed and constructed as to permit of its easy installation and use in the conversion of a single drive motor vehicle into a tandem drive motor vehicle.

Many benefits of a tandem drive for motor vehicles have long been recognized, particularly in motor bus and truck construction where road traction and load carrying capacity become important considerations. Many such vehicles at present are single drive vehicles and the operators often desire to convert such vehicles into tandem drive vehicles, or in some cases to purchase a new single drive vehicle and convert it into a tandem drive vehicle. Where it is intended to convert a single drive motor vehicle into a tandem drive motor vehicle it is essential that the tandem drive attachment be of such a construction as to be easily installed in the vehicle without the necessity of radical changes being made in the vehicle to which it is to be attached, and yet such an attachment must be positive in its action and dependable for such installation and use.

It is essential to the successful operation of a tandem drive for motor vehicles that the construction be as simple as possible in order to eliminate the unnecessary expense in construction and maintenance of such devices. In addition it is essential that provision be made for the full flexibility of the springs of the vehicle under all load conditions to which the vehicle is subjected without impairing the traction of the tandem drive wheels. In addition the weight which is carried by a tandem drive vehicle should be so distributed as to fall equally on both of the tandem drive axles in order better to equalize the strains imposed upon the axles and insure uniform traction conditions on all of the driving wheels.

In the operation of motor vehicles, and particularly trucks and the like, it is necessary to provide some means for varying the speeds of the vehicle according to the load conditions. Particularly is this true where the vehicle is used to haul a heavy load a distance and there discharge the load, and then to return to the point of beginning either with no load or a relatively light load. Unless some provision is made for varying the speed of the vehicle according to the load carried, it either is impossible to haul heavy loads on such a vehicle, or the speed in returning with no load or a light load must be so reduced as to impair the utility of such a vehicle. Where a single drive vehicle is converted into a tandem drive vehicle some provision is made for the various speeds at which the vehicle may be operated by the ordinary transmission in such vehicles. However, the use of the tandem drive attachment so increases the load carrying possibilities of such a vehicle that it is necessary to provide a lower speed for use in operating the vehicle under the full additional load and yet be able to so change this speed when the vehicle is running with a light load or no load as not to impair the speed which may be transmitted through the transmission of the vehicle.

In many cases it has been found to be desirable, particularly in trucks and the like, to provide a simple and accessible power take-off for use in operating tools such as earth drills and the like.

It is, therefore, an object of my present invention to provide a tandem drive for motor vehicles which may be used in converting a vehicle having a single drive into a tandem drive vehicle and which is simple in construction, easy to install and positive in its action.

It is a further object of my present invention to provide a tandem drive for motor vehicles which is inexpensive to construct and maintain and in which full flexibility of the vehicle springs under all load conditions is permitted without impairing the traction of the tandem driving wheels.

It is a further object of my present invention to provide a tandem drive for motor vehicles in which the weight of the vehicle and its load carried by the driving wheels is equally distributed over the tandem driving axles.

It is a further object of my invention to provide a tandem drive for motor vehicles in which provision is made for varying the speeds of the drive according to the load carried by the vehicle.

It is a further object of my invention to provide a tandem for motor vehicles in which a power take-off is provided whereby the motor of the motor vehicle may be used to operate tools such as earth drills and the like.

These and various other objects, features of arrangement, construction and operation, are plainly shown and will be best understood by reference to the accompanying drawings, in which:

Fig. 4 is a fragmentary top plan view of the tandem drive and the truck shown in Fig. 1;

Fig. 5 is a view in side elevation, partially in cross section, taken on the line 5—5 of Fig. 2;

Fig. 6 is a fragmentary detailed sectional view of the sliding hub shown in Fig. 5.

Similar reference numerals refer to similar parts throughout the several views.

Figure 1:
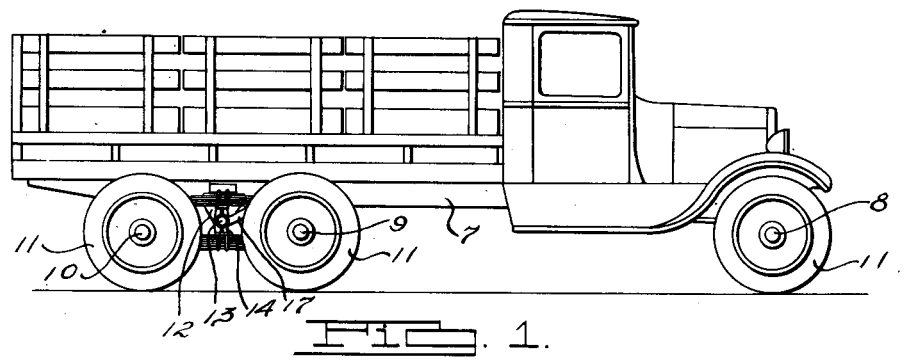
Fig. 1 is a view in side elevation of a motor truck equipped with a tandem drive embodying my invention.

Referring more in detail to the drawings, 7 designates the frame of a motor vehicle chassis having a front axle 8 and tandem driving axles 9 and 10. Wheels 11 are rotatably mounted on the said axles 8, 9 and 10. Secured at the rear of the frame 7 of the chassis is a rigid cross member 12 terminating in end portions 13. Mounted on the end portions 13 are spring supporting bracket members 14, to which are secured upper springs 15 and lower springs 16. Bracing members 17 are secured to the rigid cross member 12 and to the frame 7 of the motor vehicle chassis and act to brace the rigid cross member 12 and prevent its movement relative to the frame 7 of the motor vehicle chassis. Secured to the tandem driving axles 9 and 10 are members 18, which are held in place on the axle housings 19 and 20 surrounding the axles 9 and 10. The springs 15 and 16 are secured to the members 18 by shackle connections 21.

The rigid cross member 12 is mounted on the frame 7 of the motor vehicle chassis in such a manner that the end portions 13 assume the same position relative to the motor vehicle frame as would a single driving axle if the motor vehicle were so constructed. The axles 9 and 10 are mounted inside of the axle housings 19 and 20, as in usual automotive construction. The axle 9 in the axle housing 19 is the same as the axle 10 in the axle housing 20, it being my intention to use the usual stock axle assemblies for the particular make of motor vehicle used in this construction. The axle assembly containing the axle 10 and the axle housing 20 is placed at the rear of the rigid cross member 12 and the axle assembly containing the axle 9 and the axle housing 19 is placed in front of the rigid cross member 12. The openings provided in the axle housings 19 and 20, through which pass the means for driving the axles 9 and 10 face respective sides of the rigid cross member 12. The axle assembly containing the axle 10 being placed in the normal position with the opening in the axle housing 20 facing the forward end of the motor vehicle, while the axle assembly containing the axle 9 is reversed so that the opening in the axle housing 19 faces the rear of the motor vehicle.

The rigid cross member 12 is constructed with a box portion 22. An upper shaft 23 is suitably mounted on bearings 43, and a lower shaft 24, likewise suitably mounted on bearings 43, is mounted in the lower portion of the box 22. Loosely mounted on the upper shaft 23 are chain sprocket wheels 25 and 26. Mounted on the lower shaft 24 are chain sprockets 27 and 28. A driving chain 29 connects the sprocket wheel 25 with the sprocket 27 in the axle 24, and a driving chain 30 connects the sprocket wheel 26 with the sprocket 28 in the axle 24.

The axle 24 is connected on one side to a universal joint member 31, which connects with a driving shaft 32, and on the other side to a universal joint member 33, which connects with a driving shaft 34. The upper axle 23 is connected with a universal joint member 35, to which is attached a driving shaft 36 which may be used as a power take-off. The upper axle 23 is rotated by the driving shaft 37, which is connected with the source of power of the motor vehicle through the usual transmissions and clutches employed on vehicles of this general type and operates through the universal joint 38 to rotate the axle 23. As shown in Fig. 5, the sprocket wheels 25 and 26 are loosely mounted on the axle 23. A toothed splined hub 39 is mounted on the shaft 23 and rotates with said shaft. Movement of the toothed splined hub 39 in an endwise direction causes the teeth of the splined hub 39 to contact with teeth on the sprocket wheel 25, causing the sprocket wheel 25 to rotate with the shaft 23, and movement of the toothed splined hub 39 in the opposite endwise direction causes the sprocket wheel 26 to rotate with the shaft 23. When the sprocket wheels 25 and 26 are not engaged by the toothed splined hub 39, there is no movement of the sprocket wheels with the shaft 23.

A lever 40, pivotally mounted in the box portion 22, terminates in a yoke 41 which contacts with a groove 42 in the toothed splined hub 39. An operating lever 44 contacts with the lever 40 and provides the means for operating the lever 40 to move the toothed splined hub 39 in an endwise direction. The box 22 is so constructed that the entire mechanism contained therein may be run in oil at all times and thus insures a complete lubrication of all the moving parts contained therein.

The shaft 32, attached through the universal joint 31 with the shaft 24, enters through the opening in the axle housing 20 and connects with the means contained therein for driving the axle 10. Likewise the shaft 34 connects through the universal joint 33 with the shaft 24 and passes through the opening in the axle housing 19 and connects with the mechanism contained therein for driving the axle 9.

The usual brake drums are employed in the axle assemblies used in constructing my tandem attachment and the means of hooking up the brakes are so well known to those skilled in the art that it is not deemed necessary to describe them at length in this application.

The operation of my invention is as follows: After the member 12 carrying the box 22 has been rigidly secured to the frame 7 of the motor vehicle chassis, the driving shaft 37 of the motor vehicle is connected through the universal joint 38 to the upper shaft 23 mounted in the chain box 22 and transmits rotation of the shaft 37 to the shaft 23. In the position shown in Fig. 5, the shaft 23 rotates freely and the rotation is transmitted through the universal joint 35 to the power take-off shaft 36 where the power of the motor vehicle is available for use with tools such as earth drills and the like.

The driving chains 29 and 30, connecting the upper sprockets 25 and 26 with the lower sprockets 27 and 28, transmit whatever motion may be transmitted to the sprockets 25 and 26 to the lower shaft 24, the motion from the lower shaft 24 being transmitted through the universal joints 31 and 33 to the driving shafts 32 and 34, the power from the driving shafts 32 and 34 being transmitted through the rear axle gears (not shown) to the axles 9 and 10.

Upon movement of the splined toothed hub 39 in an endwise direction one of the sprockets 25 or 26 is engaged by the teeth on the toothed splined hub 39 and causes whichever sprocket wheel it engages to revolve with the shaft 23, which motion is transmitted through the driving chain 29 or 30 to the lower sprocket 27 or 28, causing a rotation of the shaft 24 and the shafts 32 and 34. By varying the relative sizes of the sprockets 25 and 26 and the sprockets 27 and 28, it is possible to vary the speeds at which the lower shaft 24 will be driven relative to the shaft 23. In the embodiment of my invention shown herein, the sprocket 26 has a capacity of driving the shaft 24 at a higher speed than has the sprocket 25. This provides for relatively high and low speeds in driving the tandem axles 9 and 10. In Fig. 6 the toothed splined hub 39 is shown in a position for engaging the sprocket 25 for causing its rotation with the shaft 23, it being understood that a movement of the toothed splined hub 39 in the opposite direction would permit the rotation of the sprocket 25 independent of the shaft 23 and cause a rotation of the sprocket 26 with the shaft 23.

Figure 3:
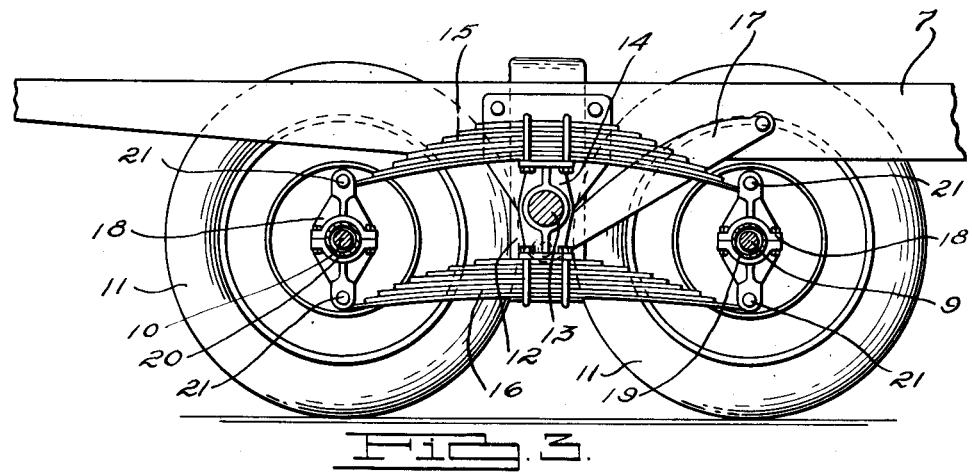
Fig. 3 is a sectional view in side elevation taken on the line 3—3 of Fig. 2.
Figure 2:
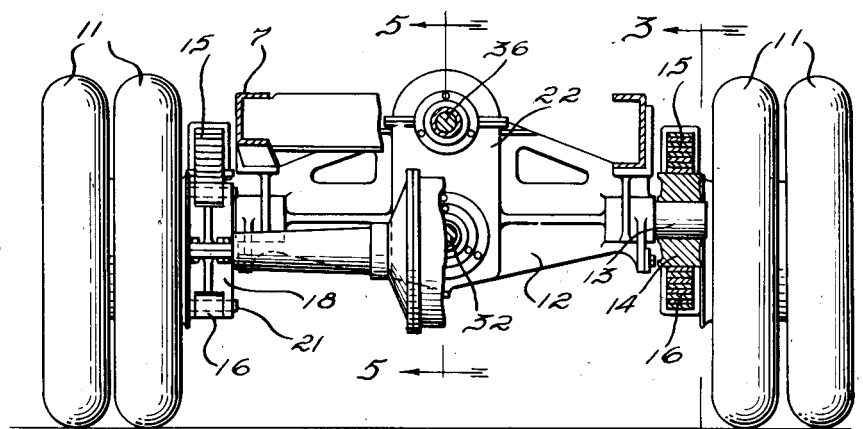
Fig. 2 is a rear elevational view of the truck shown in Fig. 1 with parts broken away to show certain details of construction.

The mounting of the springs 15 and 16 as shown in Fig. 3 and connecting with the members 18 secured to the axle housings 19 and 20, form a flexible connection between the axle housings 19 and 20 and the frame 7 of the motor vehicle chassis. Such a construction permits a full rocking movement between the tandem driving axles 9 and 10.

From the foregoing it will be apparent that I have described a device embodying my invention and have shown a tandem drive for motor vehicles which is particularly adapted for use in converting a single drive motor vehicle into a tandem drive motor vehicle and have shown a device which is simple in its construction, easy to install on a motor vehicle and positive in its operation, and in which full flexibility of the vehicle springs under all load conditions is permitted without impairing the traction of the tandem driving axles.

It is also to be observed that in a device as described embodying my invention the weight of the vehicle and its load carried by the driving wheels is equally distributed on both of the tandem driving axles. Provision also is made for varying the speeds at which the tandem axles are driven in accordance with the load carried by the vehicle, and I also have provided a convenient and simple power take-off whereby the power of the motor vehicle is made available for use in operating tools such as earth drills and the like.

While I have illustrated and described one embodiment of my invention, it is apparent that various changes and modifications may be made without departing from the spirit of my invention, and I do not wish to be limited to the precise details of construction as herein set forth, but desire to avail myself of all changes within the scope of the appended claims.

Having thus described my invention, what I claim is new and desire to secure by Letters Patent of the United States, is:

1. A tandem drive for motor vehicles including a rigid member secured to the frame of a motor vehicle, means secured to said rigid member for supporting vehicle springs, vehicle springs secured to said means, a driving axle adjacent one side of said rigid member, a second driving axle adjacent the opposite side of said rigid member, means secured to said axles for attachment to said vehicle springs, means for driving said axles including a source of power, and means for transmitting power from said source of power to said axles and including a shaft operatively connected with said source of power and a second shaft operatively connected with said axles, a chain box secured to said rigid member, means within said chain box for transmitting motion from one of said shafts to the other of said shafts and including sprockets secured to said shafts, and a splined hub mounted on one of said shafts adjacent the sprockets carried on said shaft, and means for moving said hub to engage selectively one of said sprockets.

2. A tandem drive for motor vehicles including a rigid member secured to the frame of a motor vehicle, means secured to said rigid member for supporting vehicle springs, vehicle springs secured to said means, a driving axle adjacent one side of said rigid member, a second driving axle adjacent the opposite side of said rigid member, means secured to said axles for attachment to said vehicle springs, means for driving said axles including a source of power, and means for transmitting power from said source of power to said axles and including a shaft operatively connected with said source of power, a chain box secured to said rigid member, means within said chain box for transmitting motion from said shaft to said axles and including a plurality of rotatable shafts mounted in said box, means connected with one of said shafts for driving said axles, means secured to the other of said shafts for transmitting motion to said shaft from said shaft operatively connected with said source of power, and means for varying the relative speeds of said shafts including sprockets of differing sizes, and means mounted on one of said shafts for selectively rotating one of said sprockets.

3. A tandem drive for motor vehicles including a rigid member secured to the frame of the motor vehicle, means secured to said rigid member for supporting vehicle springs, vehicle springs secured to said means, a driving axle adjacent one side of said rigid member, a second driving axle adjacent the opposite side of said rigid member, means secured to said axles for attachment to said vehicle springs, means for driving said axles including a source of power, and means for transmitting power from said source of power to said axles and including a shaft operatively connected with said source of power, a chain box secured to said rigid member having therein a driving shaft and a driven shaft, sprockets of differing sizes freely mounted on said driving shaft, complementary sprockets secured to said driven shaft, driving chains connecting the sprockets on said driving and driven shafts, means slidably mounted on said driving shaft and secured to said shaft for rotation therewith for selectively engaging said sprockets on said driving shaft and transmitting motion to said driven shaft, means connecting said driving shaft with said shaft operatively connected with said source of power, and means connected with said driven shaft for driving said axles.

4. A tandem drive for motor vehicles including a rigid member secured to the frame of a motor vehicle, means secured to said rigid member for supporting vehicle springs, vehicle springs secured to said means, a driving axle adjacent one side of said rigid member, a second driving axle adjacent the opposite side of said rigid member, means secured to said axles for attachment to said vehicle springs, means for driving said axles comprising a source of power, and means for transmitting power from said source of power to said axles and including a shaft operatively connected with said source of power, a chain box secured to said rigid member having therein a driving shaft and a driven shaft, sprockets of differing sizes freely mounted on said driving shaft, complementary sprockets secured to said driven shaft, driving chains connecting the sprockets on said driving and driven shafts, means slidably mounted on said driving shaft and secured to said shaft for rotation therewith for selectively engaging said sprockets on said driving shaft and transmitting motion to said driven shaft, means for sliding said last named means on said driving shaft, mean connecting said driving shaft with said shaft operatively connected with said source of power, and means connected with said driven shaft for driving said axles.

5. A tandem drive for motor vehicles including a rigid member secured to the frame of a motor vehicle, means secured to said rigid member for supporting vehicle springs, vehicle springs secured to said means, a driving axle adjacent one side of said rigid member, a second driving axle adjacent the opposite side of said rigid member, means secured to said axles for attachment to said vehicle springs, means for driving said axles including a source of power and means for transmitting power from said source of power to said axles and comprising a shaft operatively connected with said source of power, a chain box secured to said rigid member having therein a driving shaft and a driven shaft, sprockets of differing sizes freely mounted on said driving shaft, complementary sprockets secured to said driven shaft, driving chains connecting the sprockets on said driving and driven shafts, means slidably mounted on said driving shaft and secured to said shaft for rotation therewith for selectively engaging said sprockets on said driving shaft and transmitting motion to said driven shaft comprising a splined hub adapted to engage said freely mounted sprockets on said driving shaft, means connecting said driving shaft with said shaft operatively connected with said source of power, and means connected with said driven shaft for driving said axles.

6. A tandem drive for motor vehicles including a rigid member secured to the frame of a motor vehicle, means secured to said rigid member for supporting vehicle springs, vehicle springs secured to said means, a driving axle adjacent one side of said rigid member, a second driving axle adjacent the opposite side of said rigid member, means secured to said axles for attachment to said vehicle springs, means for driving said axles including a source of power, and means for transmitting power from said source of power to said axles and comprising a shaft operatively connected with said source of power, a chain box secured to said rigid member having therein a driving shaft and a driven shaft, sprockets of differing sizes freely mounted on said driving shaft, complementary sprockets secured to said driven shaft, driving chains connecting the sprockets on said driving and driven shafts, means slidably mounted on said driving shaft and secured to said shaft for rotation therewith for selectively engaging said sprockets on said driving shaft and transmitting motion to said driven shaft including a splined hub adapted to engage selectively said freely mounted sprockets on said driving shaft, and a yoke member secured to a pivoted member for sliding said splined hub on said driving shaft, means connecting said driving shaft with said shaft operatively connected with said source of power, and means connected with said driven shaft for driving said axles.

7. A tandem drive for motor vehicles including a rigid member secured to the frame of a motor vehicle, means secured to said rigid member for supporting vehicle springs, vehicle springs secured to said means, a driving axle adjacent one side of said rigid member, a second driving axle adjacent the opposite side of said rigid member, means secured to said axles for attachment to said vehicle springs, means for driving said axles including a source of power, and means for transmitting power from said source of power to said axles and including a shaft operatively connected with said source of power, a chain box secured to said rigid member having therein a driving shaft and a driven shaft, sprockets of differing sizes freely mounted on said driving shaft, complementary sprockets secured to said driven shaft, driving chains connecting the sprockets on said driving and driven shafts, means slidably mounted on said driving shaft and secured to said shaft for rotation therewith for selectively engaging said sprockets on said driving shaft and transmitting motion to said driven shaft, means connecting said driving shaft with said shaft operatively connected with said source of power, and means connected with said driven shaft for driving said axles, and means secured to said driving shaft whereby power from said source of power is made available for purposes other than driving said axles.

8. A tandem drive for motor vehicles including a rigid member having a chamber therein secured to the frame of the said motor vehicle, springs secured to said rigid member, a driving axle adjacent one side of said rigid member, a second driving axle adjacent the opposite side of said rigid member, mean securing said axles to said springs, means for driving said axles including a source of power, and means for transmitting power from said source of power to said axles and including a plurality of shafts mounted in said chamber in said rigid member, one of said shafts being operatively connected with said source of power and other of said shafts being operatively connected with means for driving said axles, means for imparting motion from one of said shafts to other of said shafts, and means for varying selectively the relative speeds of rotation of said shafts.

9. A tandem drive for motor vehicles including a rigid member secured to the frame of a motor vehicle, means secured to said rigid member for supporting vehicle springs, vehicle springs secured to said means, a driving axle adjacent one side of said rigid member, a second driving axle adjacent the opposite side of said rigid member, means secured to said axles for attachment to said vehicles springs, means for driving said axles including a source of power, and means for transmitting power from said source of power to said axles and including a shaft operatively connected with said source of power, and a second shaft operatively connected with said axles, a housing secured to said rigid member, means within said housing for transmitting motion from one of said shafts to the other of said shafts and including means carried on said shafts, and a splined hub mounted on one of said shafts adjacent the means carried on said shaft, and means for moving said hub to vary the speeds of said means carried on said shafts.

10. A tandem drive for motor vehicles including a rigid member secured to the frame of a motor vehicle, means secured to said rigid member for supporting vehicle springs, vehicle springs secured to said means, a driving axle adjacent one side of said rigid member, a second driving axle adjacent the opposite side of said rigid member, means secured to said axles for attachment to said vehicle springs, a source of power, and means for transmitting power from said source of power to said axles, said transmitting means including a drive shaft operatively connected with said source of power, a housing secured to said rigid member, means within said housing for transmitting motion from said drive shaft to said axles and including a driven unit mounted in said housing, means connected with said driven unit for driving said axles, means operatively connecting said drive shaft and unit for transmitting motion from the drive shaft to the driven unit, and means for selectively varying the relative speeds of the drive shaft and unit.

In witness whereof, I hereunto subscribe my name this 9th day of January, 1931.

RAY THORNTON.